No. 868,133. PATENTED OCT. 15, 1907.
F. SCHMIDT.
RUNNING GEAR FOR VEHICLES.
APPLICATION FILED NOV. 16, 1905. RENEWED DEC. 31, 1906.
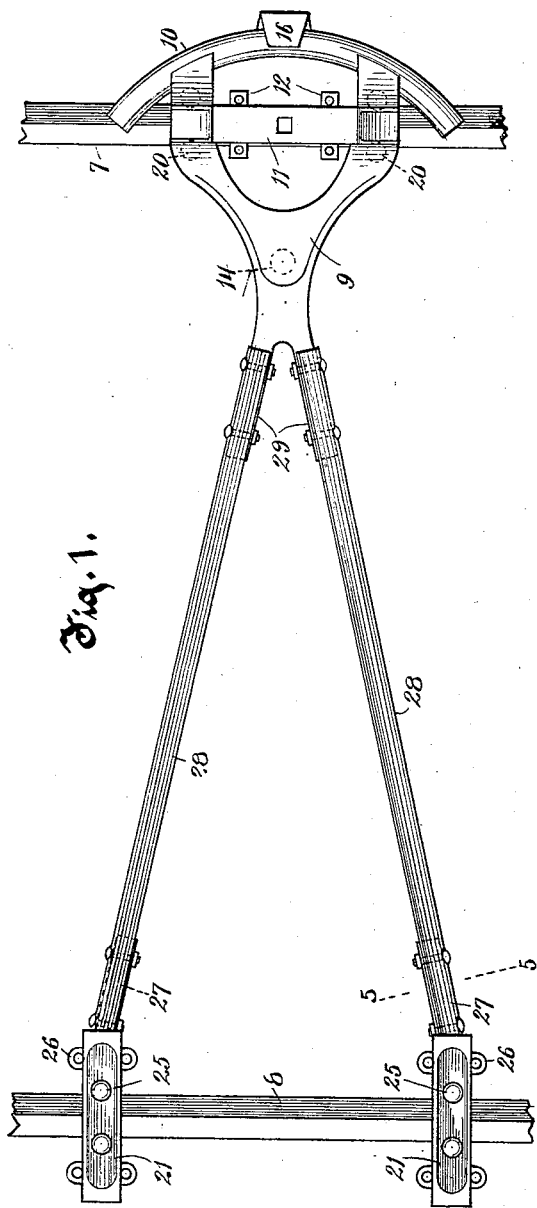
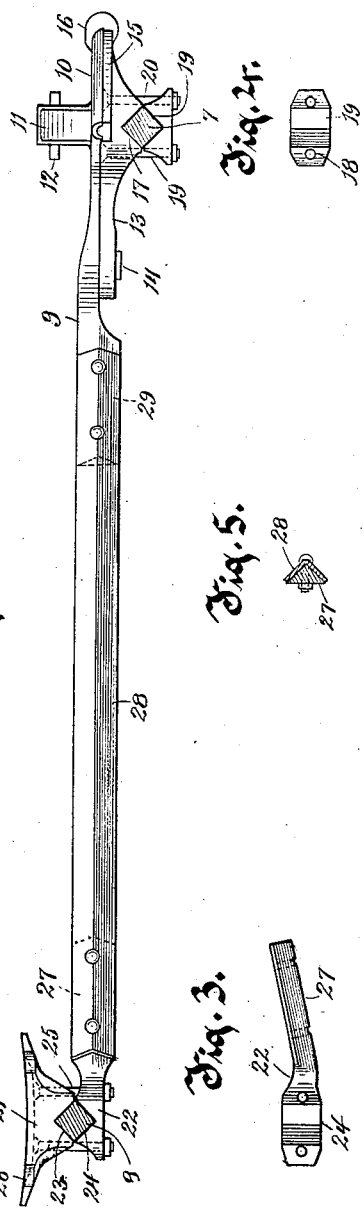
Witnesses.
C. H. Keeney.
R. S. C. Caldwell.
Inventor.
Frederick Schmidt
By Benedich and Morsell.
Attorneys.

UNITED STATES PATENT OFFICE.

FREDERICK SCHMIDT, OF WEST BEND, WISCONSIN.

RUNNING-GEAR FOR VEHICLES.

No. 868,133.            Specification of Letters Patent.            Patented Oct. 15, 1907.

Application filed November 16, 1905, Serial No. 287,618. Renewed December 31, 1906. Serial No. 350,181.

*To all whom it may concern:*

Be it known that I, FREDERICK SCHMIDT, residing in West Bend, in the county of Washington and State of Wisconsin, have invented new and useful Improvements in Running-Gear for Vehicles, of which the following is a description, reference being had to the accompanying drawings, which are a part of this specification.

This invention relates to running gear for vehicles and has for its object to provide a running gear of novel construction, wherein square axles are arranged edgewise to be in position to withstand, to the greatest degree, the stress to which they are subjected, and enabling them to be engaged entirely around by their clamping devices.

Another object of this invention is to provide a divided reach with members of angle iron construction.

With the above and other objects in view the invention consists in the device as herein described, its parts and combinations of parts, and all equivalents.

Referring to the accompanying drawings in which like characters of reference indicate the same parts in the several views:—Figure 1 is a plan view of a portion of a vehicle running gear, illustrating the features involved in this invention; Fig. 2 is a side elevation thereof; Fig. 3 is a plan view of one of the reach couplings; Fig. 4 is a plan view of a front axle clip; and, Fig. 5 is a transverse sectional view of one of the reach members, taken on the line 5—5 of Fig. 1.

In these drawings 7 represents the front axle and 8 the rear axle, both being square in cross section and arranged edgewise, that is in such manner that the diagonal lines of their transverse sectional planes are vertical and horizontal.

A fifth wheel is provided, which comprises an upper and a lower member, the yoked upper member 9 carrying an arc-shaped bearing segment 10 at the front ends of its yoke arms. The yoke arms are bridged across by a bolster 11 having the usual laterally extending ears 12 to receive the bolts which clamp the front spring in place upon the bolster, said spring being omitted from the drawing. The lower member 13 of the fifth wheel is also of a yoke shape, with its stem pivoted to a stud or pin 14 on the under side of the member 9. Its yoke arms also carry an arc-shaped bearing segment 15 which interfits with the bearing segment 10, so as to be slidable thereon when the lower member turns upon stud 14, there being a hook-shaped projection 16 on the bearing segment 15 extending up over the bearing segment 10 to hold the bearing segments together.

The yoke arms of the lower member 13 of the fifth wheel are provided underneath with V-shaped sockets 17 in alinement with each other and fitting upon the upper surface of the front axle 7, and axle clips 18 having similarly shaped sockets 19 in their upper portion fit on the lower surface of the axle 7 beneath the yoke arms and are clamped to the arms of member 13 by means of bolts 20. In this manner the axle 7 is entirely surrounded by the clamps formed by the sockets 17 and 19, of the member 13 and clips 18 respectively. The rear axle 8 is similarly clamped between blocks 21 above and reach couplings 22 below, the former having V-shaped sockets 23 fitting the upper surface of the axle and the latter having V-shaped sockets 24 fitting the lower surface of the axle, and the two being clamped upon the axle by means of the connecting bolts 25. The blocks 21 are provided with the usual laterally extending perforated ears 26 through which the bolts or clips holding the rear springs are engaged, said springs being omitted from the drawing.

The reach couplings 22 have forwardly and inwardly extending arms 27, which are triangular in cross section and have the rear ends of reach members 28 bolted thereto, said reach members being of angle iron construction and connecting at their front ends with similar rearwardly extending diverging arms 29 on the rear end of the upper member 9 of the fifth wheel.

By arranging the axles edgewise as shown and described, their greatest sectional dimensions are arranged in the direction in which they receive the greatest stress, and they are therefore stronger than they would be if disposed in the usual manner, that is with the flat sides vertical and horizontal. Furthermore, by so arranging the axles their clamps are enabled to entirely surround them with their clamping surfaces, whereas with the axles in the usual position they may be only clamped on their top and bottom faces.

By employing reach members of angle iron construction they are made very strong and secure and are capable of easy attachment to the fifth wheel and to the rear axle.

What I claim as my invention is;

1. In a vehicle running gear, a rear axle square in cross section arranged with the diagonals of its transverse section vertical and horizontal, and a block mounted on the rear axle and having a V-shaped socket in its under part fitting upon the upper surface of the rear axle, a reach coupling having a V-shaped socket fitting against the under surface of the rear axle beneath the block, and clamping bolts passing through the block and the reach coupling and clamping the rear axle therebetween.

2. In a vehicle running gear, a front axle square in cross section arranged with the diagonals of its transverse section vertical and horizontal, a fifth wheel having a yoked member with V-shaped sockets formed in the under part of its yoke arms and fitting upon the upper surface of the front axle, axle clips having V-shaped sockets fitting against the under surface of the front axle beneath said yoke arms, clamping bolts clamping the clips and yoke arms upon the front axle, a rear axle square in cross section arranged with the diagonals of its transverse section vertical and horizontal, a pair of spring blocks mounted on the rear axle and having V-shaped sockets in their under parts fitting upon the upper surface of the rear axle, reach couplings having V-shaped sockets fitting against the under surface of the rear axle beneath the spring blocks, clamping bolts passing through the spring blocks and the reach couplings and clamping the rear axle therebetween, arms triangular in cross section formed on the reach couplings, a fifth wheel member pivotally mounted on the yoked member of the fifth wheel and provided with rearwardly extending diverging arms, and reach members of angle iron construction connecting the arms of the fifth wheel member and the arms of the reach couplings.

In testimony whereof, I affix my signature, in presence of two witnesses.

FREDERICK SCHMIDT.

Witnesses:
J. M. BARNEY,
G. A. KUNHENMEISTER.